W. J. PARSONS.
LAWN TRIMMER.
APPLICATION FILED JAN. 12, 1916.
1,189,168.
Patented June 27, 1916.
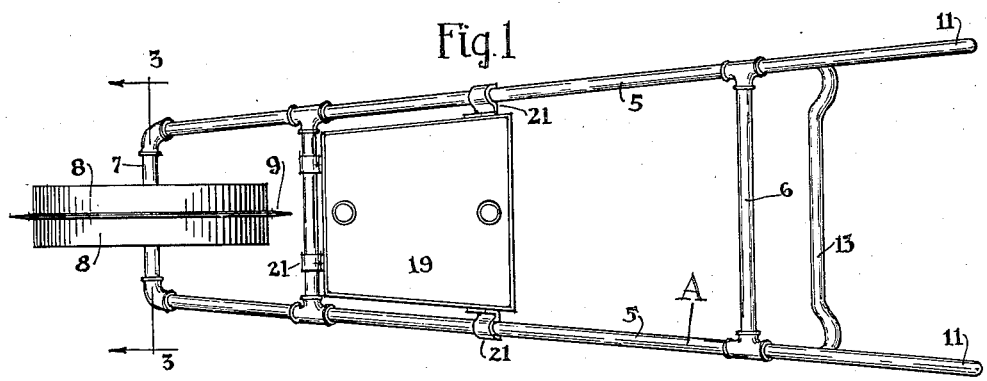
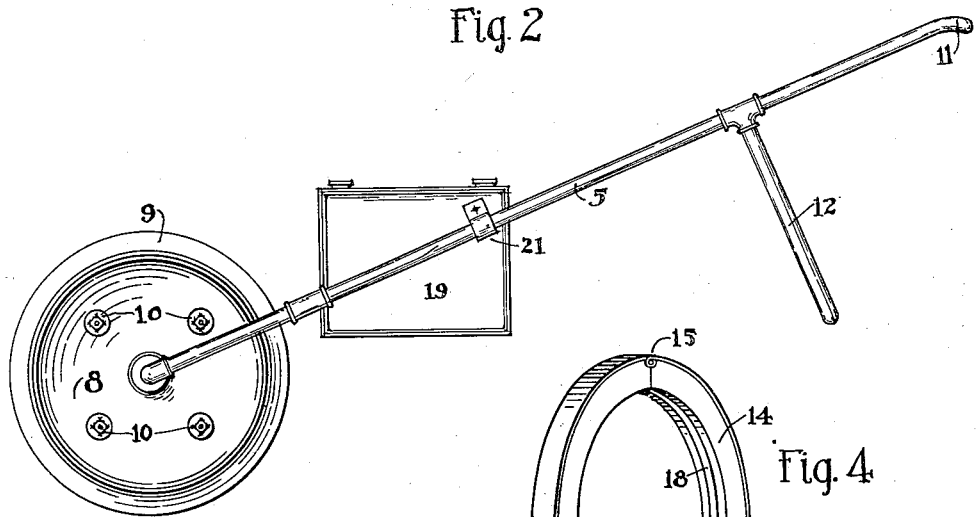
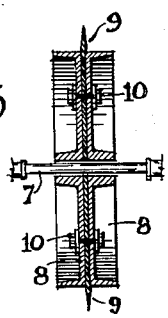
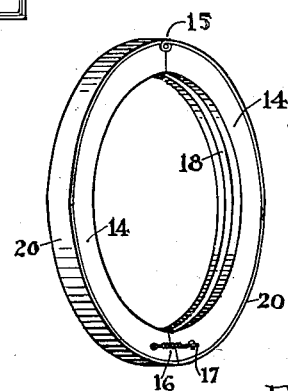
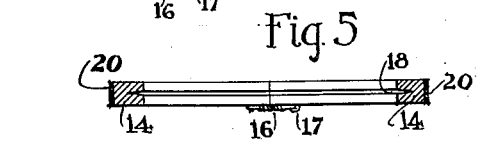
Inventor
W. J. Parsons
By Victor J. Evans
Attorney

UNITED STATES PATENT OFFICE.

WARREN J. PARSONS, OF HUNTINGTON, WEST VIRGINIA.

LAWN-TRIMMER.

1,189,168.

Specification of Letters Patent. Patented June 27, 1916.

Application filed January 12, 1916. Serial No. 71,743.

*To all whom it may concern:*

Be it known that I, WARREN J. PARSONS, a citizen of the United States, residing at Huntington, in the county of Cabell and State of West Virginia, have invented new and useful Improvements in Lawn-Trimmers, of which the following is a specification.

The invention relates to a lawn trimmer, and has for its primary object to provide a device of this character wherein the cutting disk is of greater diameter than the traction rollers so as to travel faster than the latter for effecting a sheer cut, and by reason of the particular mounting of the cutting disk and traction rollers the weight of the carriage or load will be centered on either of the rollers to assure the edge cutting of the lawn for the trimming thereof.

Another object of the invention is the provision of a device of this character wherein the cutting disk is protected when not intended for use and the device can be moved from one point to another.

A further object of the invention is the provision of a lawn trimmer of this character which is extremely simple in construction, thoroughly reliable and efficient in operation, strong, durable and inexpensive of manufacture.

Other objects will be in part obvious and in part hereinafter pointed out.

The invention accordingly consists in the features of construction, combination of elements and arrangement of parts which will be exemplified in the construction hereinafter set forth, and the scope of the application of which will be indicated in the claim hereunto appended.

In the accompanying drawings: Figure 1 is a top plan view of a device constructed in accordance with the invention; Fig. 2 is a side elevation thereof; Fig. 3 is a sectional view on the line 3—3 of Fig. 1; Fig. 4 is a perspective view showing the protective annulus for the cutting disk; Fig. 5 is a vertical transverse sectional view thereof.

Similar reference characters indicate corresponding parts in all views throughout the drawings.

Referring to the drawings in detail, the lawn trimmer comprises a frame A including the side members 5, preferably made from metal tubing or wood, and the cross strut 6 which constitute the frame. Journaled in the side members 5 of the frame A at the forward ends thereof is an axle 7 on which are loosely mounted rotatable traction rollers 8 having arranged therebetween a cutting disk 9 which is of greater diameter than the rollers 8, and passed transversely through the latter and the said disk 9 are bolt members 10 shown in Fig. 2 which securely fasten the same together to form a unit. The axle 7 is of a length greater than the width of the rollers 8 and the disk 9 so that the said rollers and disk will move as a unit between the members 5 of the frame so that the weight of the load will be centered on either of the rollers 8 when the disk 9 is cutting against the side of the curb or walk, the diameter of the disk 9 being greater than the diameter of the rollers 8 serving to effect a sheer cutting of the edge of the lawn against the curb or walk when either roller 8 is traveling upon a walk or the curb. The rear ends of the members 5 form handles 11 for permitting manual moving of the device, and connected to these members 5 are the side pieces 12 of a prop or rest 13 so that the frame A can be brought to rest when occasion may require.

The protective annulus for the cutting disk 9 comprises a pair of half circular sectors 14 which, at the ends adjacent each other, are connected together through the medium of a hinge 15 mounted on the outer periphery thereof, while the opposite ends are detachably connected to each other through the medium of a hook and eye 16 and 17 or other devices, the inner periphery of the annulus or the sectors thereof being formed with a channel 18 for accommodating the outer periphery of the disk 9 when the annulus is concentrically disposed about the said disk so that the latter can be used as an ordinary wheel when moving the device from one point to another and thereby protecting the sharpened edge of the disk 9 in this manner.

Mounted upon the frame A is a tank 19 which is adapted to accommodate a fluid for adding weight to the frame so as to assure the penetration of the cutting edge of the disk 9 in hard ground. The quantity of fluid within the tank determines the weight or pressure upon the disk.

From the foregoing description, taken in connection with the accompanying drawings, the construction and manner of operation of the lawn trimmer will be readily apparent and a more detailed explanation, therefore, has been omitted.

Having thus described my invention, I claim:

A lawn trimmer comprising a frame having a stationary axle, a broad tread pulley-like wheel formed in two sections journaled upon the axle, a peripherally sharpened disk arranged between the sections of the wheel and having a diameter greater than the diameter of said wheel, bolts passed through the sections of the wheel and the disk for uniting the same, a two-part rim arranged concentrically about the peripherally sharpened disk and having an internal groove correspondingly shaped to the sharpened periphery of said disk for receiving the same, a hinge swingingly connecting the parts of the rim, and a latch for fastening the parts of the rim when closed.

In testimony whereof I affix my signature in presence of two witnesses.

WARREN J. PARSONS.

Witnesses:
F. F. McCullough,
H. W. Quinn.